United States Patent
Kim et al.

(10) Patent No.: US 12,542,173 B2
(45) Date of Patent: Feb. 3, 2026

(54) 2-STEP SENSING SENSE AMPLIFIER AND MEMORY DEVICE INCLUDING THE SAME

(71) Applicant: Samsung Electronics Co., Ltd., Suwon-si (KR)

(72) Inventors: Taeyun Kim, Suwon-si (KR); Junmyung Woo, Suwon-si (KR); Taewon Kim, Suwon-si (KR); Yanggyoon Loh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 117 days.

(21) Appl. No.: 18/507,615

(22) Filed: Nov. 13, 2023

(65) Prior Publication Data

US 2024/0257862 A1    Aug. 1, 2024

(30) Foreign Application Priority Data

Jan. 31, 2023   (KR) .................. 10-2023-0013185

(51) Int. Cl.
  *G11C 11/4091*   (2006.01)
  *G11C 11/408*    (2006.01)
  *G11C 11/4094*   (2006.01)

(52) U.S. Cl.
  CPC ...... *G11C 11/4091* (2013.01); *G11C 11/4087* (2013.01); *G11C 11/4094* (2013.01)

(58) Field of Classification Search
  CPC .................................................. G11C 11/4091
  USPC .................................................. 365/189.011
  See application file for complete search history.

(56) References Cited

U.S. PATENT DOCUMENTS

| 7,209,399 B2* | 4/2007 | Chun ................. G11C 11/4094 365/205 |
| 7,466,616 B2 | 12/2008 | Byun et al. |
| 8,130,561 B2 | 3/2012 | Choi |
| 8,395,953 B2 | 3/2013 | Kim et al. |
| 9,401,185 B1 | 7/2016 | Lim et al. |
| 10,714,153 B2 | 7/2020 | Miyatake |
| 2010/0034006 A1* | 2/2010 | Takahashi ............. G11C 7/065 365/207 |
| 2022/0139429 A1 | 5/2022 | Lee et al. |

FOREIGN PATENT DOCUMENTS

KR    10-2009-0119143 A    11/2009
KR       102280332 B1     7/2021

* cited by examiner

*Primary Examiner* — Anthan Tran
(74) *Attorney, Agent, or Firm* — Harness, Dickey & Pierce, P.L.C.

(57) ABSTRACT

An LSA circuit includes a first sensing transistor and a second sensing transistor connected in series between a local I/O line and a complementary local I/O line, a pre-sensing driver configured to drive an LSA sensing voltage to a connection node between the first sensing transistor and the second sensing transistor during a pre-sensing operation of the LSA circuit, and a main-sensing driver configured to drive the LSA sensing voltage to the connection node during a main-sensing operation of the LSA circuit. A driving strength of the pre-sensing driver is set to be weaker than a driving strength of the main-sensing driver, and the pre-sensing driver is driven before the main-sensing driver.

10 Claims, 11 Drawing Sheets

2-STEP SENSING SENSE AMPLIFIER AND MEMORY DEVICE INCLUDING THE SAME

CROSS-REFERENCE TO RELATED APPLICATIONS

This application is based on and claims priority under 35 U.S.C. § 119 to Korean Patent Application No. 10-2023-0013185, filed on Jan. 31, 2023, in the Korean Intellectual Property Office, the disclosure of which is incorporated by reference herein in its entirety.

BACKGROUND

Various example embodiments relate to a semiconductor memory device, and more particularly, to a local input/output line sense amplifier (LSA) circuit for performing a 2-step sensing operation to reduce a leakage current due to a driving voltage difference with respect to a bit line sense amplifier (BLSA), and/or a memory device including the same.

A dynamic random access memory (DRAM) operates as data is written and read with charge stored in a cell capacitor of a memory cell. In a DRAM, a memory cell array is connected to bit lines and complementary, or barred, bit lines. When a read operation is performed, a BLSA senses and amplifies a voltage difference between a bit line and a complementary bit line, e.g., a voltage difference of a pair of bit lines. Data of a pair of bit lines sensed by the BLSA is selectively transmitted to a pair of local input/output lines by column select transistors, and an LSA amplifies data from the pair of local input/output lines. The data of the pair of local input/output lines amplified by the LSA is then transferred to a pair of global input/output lines, and a global input/output line sense amplifier amplifies data of the pair of global input/output lines and output amplified data to the outside through data (DQ) pad(s) as read data.

To support the high-speed operation of a DRAM, there is a design trend in which the driving voltage level of a BLSA is lowered, while the driving voltage level of an LSA is increased. In this case, a leakage current occurs from the LSA to the BLSA through column select transistors due to a difference between a low driving voltage of the BLSA and a high driving voltage of the LSA. Due to the leakage current, the sensing current of the LSA may be reduced, and thus the performance of a DRAM may be deteriorated. A speed and/or a power consumption may be affected.

SUMMARY

Various example embodiments may provide a local input/output line sense amplifier (LSA) circuit that performs a 2-step sensing operation to reduce a leakage current due to a driving voltage difference with respect to a bit line sense amplifier circuit (BLSA), and/or a memory device including the same.

According to some example embodiments, there is provided a local input/output (I/O) line sense amp (LSA) circuit configured to amplify a voltage difference of a pair of local I/O lines electrically connected to a pair of bit lines connected to a bit line sense amplifier (BLSA) circuit. The LSA circuit including a first sensing transistor and a second sensing transistor connected in series between a local I/O line and a complementary local I/O line. A gate of the first sensing transistor is connected to the local I/O line, and a gate of the second sensing transistor is connected to the complementary local I/O line. The LSA circuit includes a pre-sensing driver configured to drive an LSA sensing voltage to a connection node between the first sensing transistor and the second sensing transistor during a pre-sensing operation of the LSA circuit, and a main-sensing driver configured to drive the LSA sensing voltage to the connection node during a main-sensing operation of the LSA circuit. A driving strength of the pre-sensing driver is set to be weaker than a driving strength of the main-sensing driver, and the pre-sensing driver is driven before the main-sensing driver.

Alternatively or additionally according to various example embodiments, there is provided a memory device including a bit line sense amplifier (BLSA) circuit connected between a bit line and a complementary bit line that are connected to a memory cell, the BLSA being configured to sense a voltage change of the bit line and to output a voltage difference a pair of bit lines based on a sensed voltage change, wherein the pair of bit lines include the bit line and the complementary bit line, a column select circuit configured to electrically interconnect the pair of bit lines and a pair of local I/O lines based on a column selection signal, wherein the pair of local I/O lines include a local I/O line and a complementary local I/O line, and a local I/O line sense amplifier (LSA) circuit connected between the local I/O line and the complementary local I/O line and configured to amplify a voltage difference of the pair of local I/O lines according to an LSA driving voltage. The LSA circuit includes a first PMOS transistor and a second PMOS transistor connected in series between the local I/O line and the complementary local I/O line. A gate of the first PMOS transistor is connected to the local I/O line, and a gate of the second PMOS transistor is connected to the complementary local I/O line, a third PMOS transistor connected between a connection node between the first PMOS transistor and the second PMOS transistor and an LSA driving voltage line, wherein a gate of the third PMOS transistor is connected to a first LSA enable signal, and a fourth PMOS transistor connected between the connection node and the LSA driving voltage line, wherein a gate of the fourth PMOS transistor is connected to a second LSA enable signal. A size of the third PMOS transistor is smaller than that of the fourth PMOS transistor, and the BLSA is configured to operate such that the first LSA enable signal is activated before the second LSA enable signal.

Alternatively or additionally according to some example embodiments, there is provided a memory device including a bit line sense amplifier (BLSA) circuit connected between a bit line and a complementary bit line that are connected to a memory cell and configured to sense a voltage change of the bit line and output a voltage difference of a pair of bit lines based on a sensed voltage change, wherein the pair of bit lines include the bit line and the complementary bit line, a column select circuit configured to electrically interconnect the pair of bit lines and a pair of local I/O lines based on a column selection signal, wherein the pair of local I/O lines include a local I/O line and a complementary local I/O line, and a local I/O line sense amplifier (LSA) circuit connected between the local I/O line and the complementary local I/O line and configured to amplify a voltage difference of the pair of local I/O lines according to an LSA driving voltage, wherein the LSA circuit includes a first NMOS transistor and a second NMOS transistor connected in series between the local I/O line and the complementary local I/O line, wherein a gate of the first NMOS transistor is connected to the local I/O line, and a gate of the second NMOS transistor is connected to the complementary local I/O line, a first PMOS transistor connected between a connection node between the first NMOS transistor and the second NMOS transistor and an LSA driving voltage line, wherein a gate of the first PMOS transistor is connected to a first LSA enable signal, and a second PMOS transistor connected between the connection node and the LSA driving voltage line, wherein a gate of the second PMOS transistor is connected to a second LSA enable signal, and at least one of an electrical or physical size of the first PMOS transistor is smaller than that of the second PMOS transistor, and the first LSA enable signal is activated before the second LSA enable signal.

BRIEF DESCRIPTION OF THE DRAWINGS

Some example embodiments of inventive concepts will be more clearly understood from the following detailed description taken in conjunction with the accompanying drawings in which.

DETAILED DESCRIPTION OF VARIOUS EXAMPLE EMBODIMENTS

Figure 1:
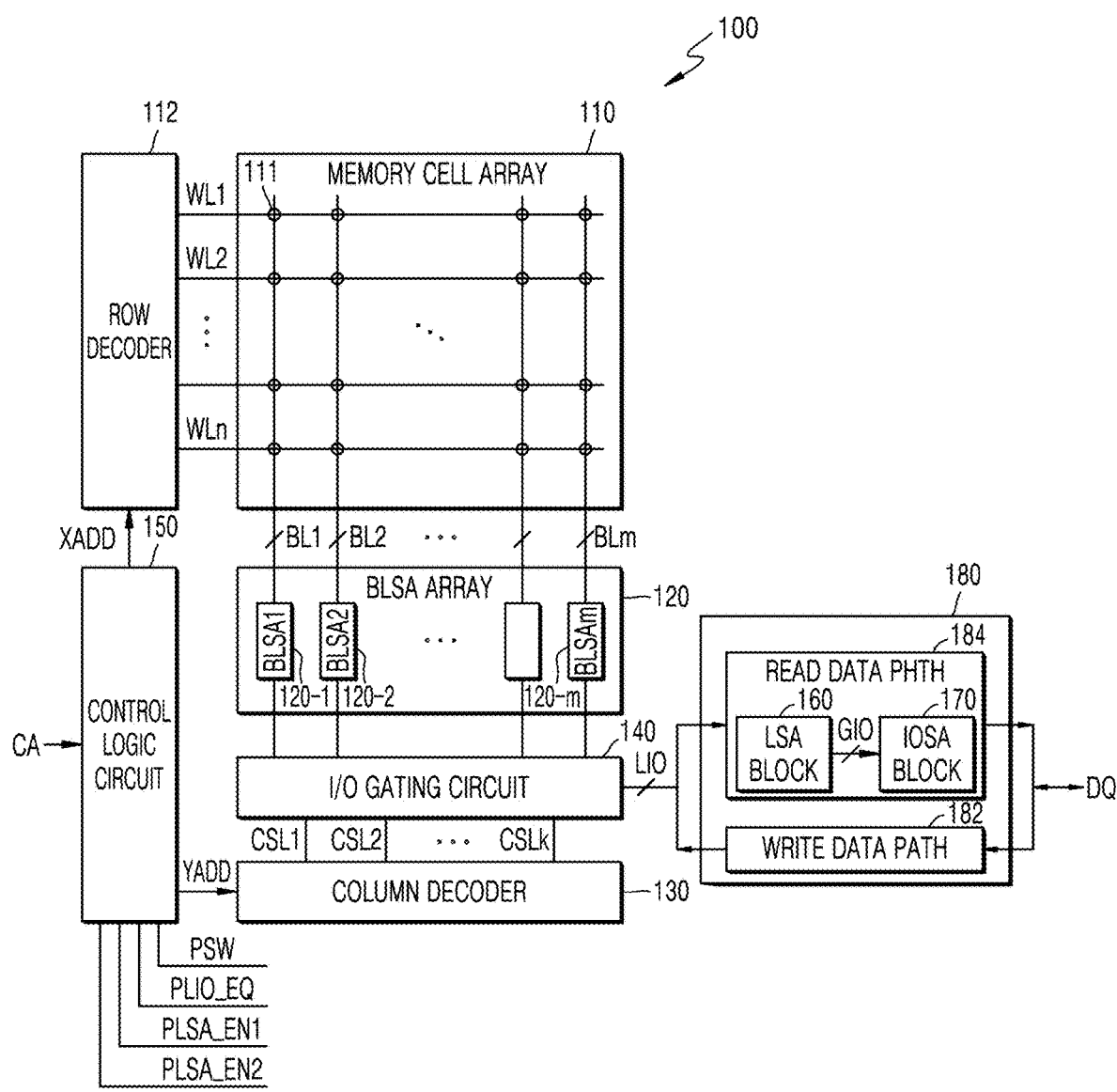
FIG. 1 is a block diagram for describing a memory device according to some example embodiments.

FIG. 1 is a block diagram for describing a memory device according to various example embodiments. FIG. 1 shows a memory device 100 implemented as a DRAM. It should be noted that the DRAM configuration shown in FIG. 1 is provided as an example and is not necessarily an actual DRAM configuration. Also, the example DRAM configuration shown in FIG. 1 does not represent or imply limitations on inventive concepts.

Referring to FIG. 1, the memory device 100 may include a memory cell array 110, a row decoder 112, a bit line sense amplifier (BLSA) array 120, a column decoder 130, and input/output (I/O) gating circuit 140, a control logic circuit 150, and a data I/O circuit 180.

The memory cell array 110 includes a plurality of memory cells 111 provided in the form of a matrix including rows and columns. The memory cell array 110 includes a plurality of word lines WLn (n is a natural number) and a plurality of bit lines BLm (m is a natural number) connected to the memory cells MC. In some example embodiments, n may be greater than, less than, or equal to m. The plurality of word lines WLn may be connected to memory cells in rows, and the plurality of bit lines BLm may be connected to memory cells in columns. Data of memory cells connected to an activated word line WL may be sensed and amplified by BLSAs connected to bit lines BL.

The row decoder 112 decodes a row address XADD and activates or turns on a word line WL corresponding to the row address XADD from among word lines WL1 to WLn. During activation of a word line (e.g., during a word line enable operation), a high voltage VPP higher than a power voltage VDD may be applied to a gate of an access transistor of a memory cell.

The BLSA array 120 includes BLSAs 120-1 to 120-$m$ implemented in an array form. The BLSAs 120-1 to 120-$m$ sense and amplify data output from corresponding memory cells 111, respectively. A BLSA 120-1 may be connected to a pair of bit lines including a bit line and a complementary bit line (or a bar bit line) to sense and amplify a voltage appearing on the bit line BL. In some examples, the bit line BL may refer to a pair of bit lines in a folded bit line sense amplifier type. The BLSAs 120-1 to 120-$m$ may each be or include or be included in a cross-coupled differential sense amplifier implemented with a P-type sense amplifier and an N-type sense amplifier.

The column decoder 130 may decode a column address YADD to generate column selection signals CSLk (k is a natural number that may be dependent on or independent of either or both m and n). The column decoder 130 may decode a burst address gradually increased by +1 based on the column address YADD in a burst mode so as to generate the column select signals CSLk, and connect the bit lines BL selected by column select signals CSL1 to CSLk the column select signal CSLk by the column select signals CSL1 to CSLk to the I/O gating circuit 140. Burst addresses refer to addresses of column locations accessible in relation to a burst length BL for a read command and/or a write command.

In response to the column select signals CSL1 to CSLk, column select transistors in the I/O gating circuit 140 may transmit voltage levels output from bit lines selected from among bit lines BL1 to BLm sensed and amplified by the BLSAs 120-1 to 120-$m$ to LSAs in an LSA block 160, respectively.

The control logic circuit 150 may control circuits of the memory device 100 to operate as set in operation and control parameters stored in a mode register of the memory device 100. The control logic circuit 150 may receive a command/address (CA) signal from a processor and/or from a memory controller. The control logic circuit 124 may receive a CA signal representing a read command and/or a write command from a memory controller and may control the circuits of the memory device 100 to perform an operation according to the read command and/or the write command. The control logic circuit 150 may generate control signals (e.g., one or more of XADD, YADD, PSW, PLSA_EQ, PLSA_EN1, and PLSA_EN2) for controlling an operation timing and/or a memory operation of the memory device 100 in response to the CA signal. According to some example embodiments, a command and an address may be provided as separate signals, e.g., in parallel or serially, e.g., concurrently.

The data I/O circuit 180 may be divided into a write data path 182 and a read data path 184. The write data path 182 may include data input buffers that receive write data DQ. The read data path 184 may include data output buffers that transmit read data DQ. The read data path 184 may include the LSA block 160 and a global I/O line sense amplifier (IOSA) block 170 for outputting the read data DQ. An LSA may amplify a voltage level transferred to a pair of local I/O lines LIO and LIOB, and an IOSA may amplify a voltage level transferred to a pair of global I/O lines GIO and GIOB.

Figure 2:
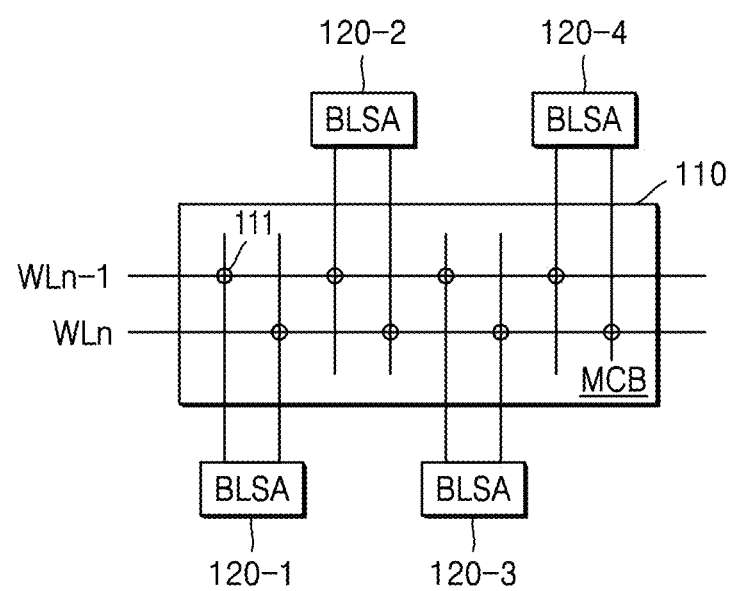
FIGS. 2 to 5B are diagrams for describing a connection structure of a bit line sense amplifier (BLSA) and a local input/output line sense amplifier (LSA) of FIG. 1.
Figure 3:
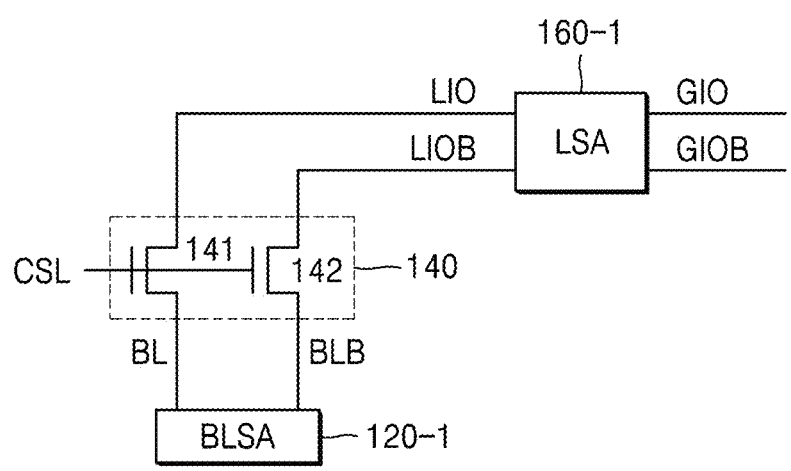
Figure 4:
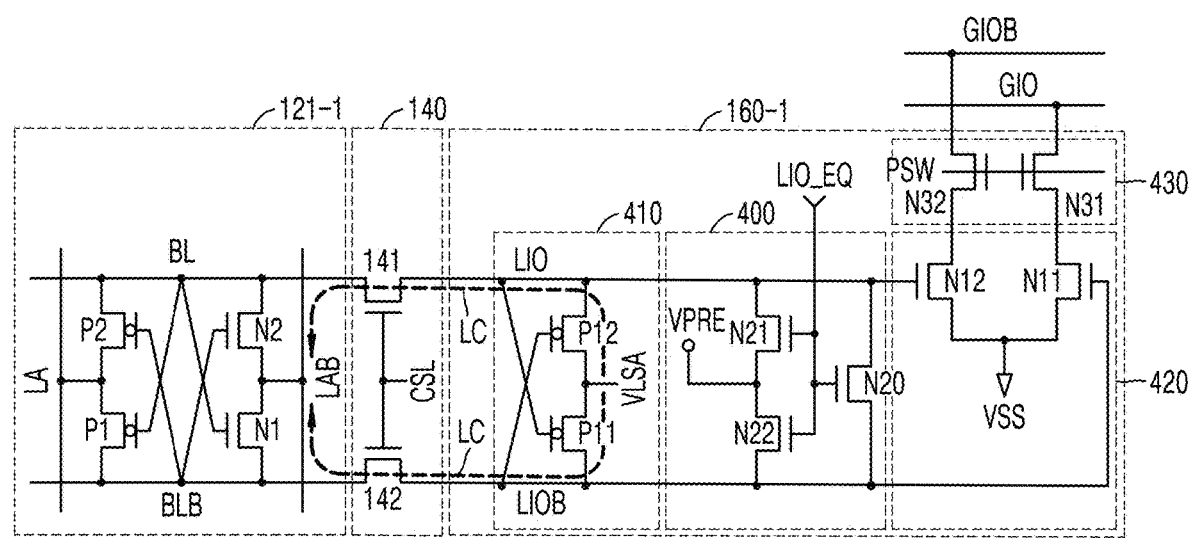
Figure 5A:
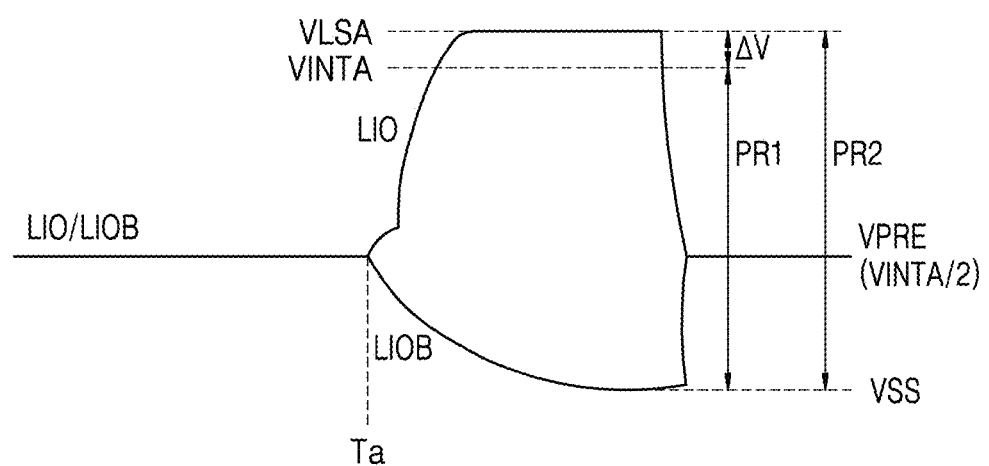
Figure 5B:
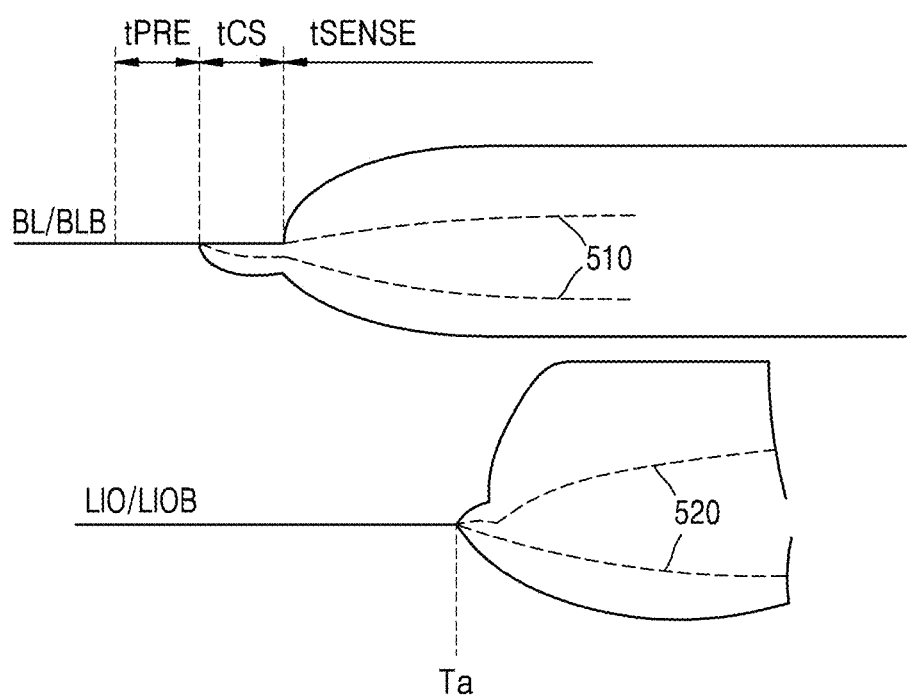

FIGS. 2 to 5B are diagrams for describing a connection structure of the BLSA and the LSA of FIG. 1. FIG. 2 illustrates the connection structure of the BLSA, and FIG. 3 illustrates the connection structure between the BLSA and the LSA. FIG. 4 is a circuit diagram for describing a BLSA and an LSA, and FIGS. 5A and 5B are diagrams for describing voltage levels of the pair of local I/O lines LIO and LIOB.

FIG. 2 shows a structure in which four pairs of bit lines of the memory cells 111 connected to word lines WLn-1 and WLn in the memory cell array 110 are connected to four BLSAs 120-1 to 120-4 in the BLSA array 120. The memory cell array 110 includes a plurality of memory banks, and each memory bank may include a plurality of memory cell blocks MCB. In some example embodiments, as shown in FIG. 2, a folded bit line sense amplifier type in which BLSAs are connected to pairs of bit lines in the same memory cell block (MCB) will be described, but example embodiments are necessarily limited thereto. For example, it may be described as an open bit line sense amplifier type in which bit lines of a first memory cell block and bit lines of a second memory cell block spaced apart from each other around the BLSA are connected to a bit line sense amplifier.

FIG. 3 shows a signal path between the BLSA 120-1 and an LSA 160-1 connected to a pair of bit lines BL and BLB (bit line true and bit line comp, or bit line bar). The LSA 160-1 may amplify the voltage level or voltage difference transmitted to the pair of local I/O lines LIO and LIOB and output an amplified voltage level to the pair of global I/O lines GIO and GIOB. The pair of global I/O lines GIO and GIOB may be connected to a data DQ pin through an IOSA and a data output buffer. The pair of bit lines BL and BLB to which the BLSA 120-1 is connected is connected to the pair of local I/O lines LIO and LIOB through column select transistors 141 and 142. The column select transistors 141 and 142 may electrically interconnect the pair of bit lines BL and BLB and the pair of local I/O lines LIO and LIOB in response to a column select signal CSL.

Referring to FIG. 4, the BLSA 120-1 may be connected between a bit line BL and a complementary bit line BLB and may sense and amplify a voltage difference between the bit line BL and the complementary bit line BLB according to a first sensing drive signal LA and a second sensing drive signal LAB. The BLSA 120-1 may include PMOS transistors P1 and P2 and NMOS transistors N1 and N2.

One end of a PMOS transistor P1 (e.g., a source or a drain end) is connected to the complementary bit line BLB, the another end (e.g., the drain or the source end) of the PMOS transistor P1 is connected to a line of the first sensing drive signal LA, and a gate of the PMOS transistor P1 is connected to the bit line BL. One end of a PMOS transistor P2 is connected to the bit line BL, another end of the PMOS transistor P2 is connected to the line of the first sensing drive signal LA, and a gate of the PMOS transistor P2 is connected to the complementary bit line BLB. One end of the an NMOS transistor N1 is connected to the complementary bit line BLB, the other end of the NMOS transistor N1 is connected to a line of the second sensing drive signal LAB, and a gate of the NMOS transistor N1 is connected to the bit line BL. One end of the an NMOS transistor N2 is connected to the bit line BL, the other end of the NMOS transistor N2 is connected to the line of the second sensing drive signal LAB, and a gate of the NMOS transistor N2 is connected to the complementary bit line BLB.

During the pre-charging operation of the BLSA 120-1, the first sensing drive signal LA and the second sensing drive signal LAB are at the pre-charge voltage level (e.g., one half of full-rail), and the bit line BL and the complementary bit line BLB are also at the level of a pre-charge voltage. A pre-charge voltage may be set to have a voltage level corresponding to half the level of a first internal power voltage VINTA or full-rail voltage VINTA, for example, the voltage level of VINTA/2. During a sensing operation of the BLSA 120-1, the first sensing drive signal LA increases from the level of a pre-charge voltage to the level of the first internal power voltage VINTA, and the second sensing drive signal LAB decreases from the pre-charge voltage level to the level of a ground voltage VSS, or zero (0) volts.

The I/O gating circuit 140 may include the column select transistors 141 and 142 for connecting the bit line BL and the complementary bit line BLB to a local I/O line LIO and a complementary local I/O line LIOB, respectively, in response to the column select signal CSL. When the column select signal CSL is at a logic high level, the voltage level of the pair of bit lines BL and BLB according to the sensing operation of the BLSA 120-1 may be applied to the pair of local I/O lines LIO and LIOB through the column select transistors 141 and 142.

The LSA 160-1 may amplify the voltage level or the voltage difference transmitted to the pair of local I/O lines LIO and LIOB and may output an amplified voltage level to the pair of global I/O lines GIO and GIOB. The LSA 160-1 may include an equalizing circuit 400, a first sensing circuit 410, a second sensing circuit 420, and a switching circuit 430.

The equalizing circuit 400 may equalize the pair of local I/O lines LIO and LIOB to the level of a pre-charge voltage VPRE in response to an equalizing signal LIO_EQ. The equalizing circuit 400 includes NMOS transistors N20, N21, and N22 connected between the local I/O line LIO and the complementary local I/O line LIOB, gates of the NMOS transistors N20, N21, and N22. are connected to the equalizing signal LIO_EQ, and connection nodes of NMOS transistors N21 and N22 are connected to a line of the pre-charge voltage VPRE. The equalizing signal LIO_EQ is provided by the control logic circuit 150 and may be configured to equalize the pair of local I/O lines LIO and LIOB to the level of the pre-charge voltage VPRE before the sensing operation by the LSA 160-1.

The first sensing circuit 410 may include PMOS transistors P11 and P12. One end (e.g., a source or a drain end) of a PMOS transistor P11 is connected to the complementary local I/O line LIOB, another end (e.g., the drain or the source end) of the PMOS transistor P11 is connected to a line of a second internal power voltage VLSA, and a gate of the PMOS transistor P11 is connected to the local I/O line LIO. One end of a PMOS transistor P12 is connected to the local I/O line LIO, the other end of the PMOS transistor P12 is connected to the line of the second internal power voltage VLSA, and a gate of the PMOS transistor P12 is connected to the complementary local I/O line LIOB.

The second sensing circuit 420 may include NMOS transistors N11 and N12. A gate of an NMOS transistor N11 is connected to the complementary local I/O line LIOB, one end of the NMOS transistor N11 is connected to a line of the ground voltage VSS, and another end of the NMOS transistor N11 is connected to a global I/O line GIO through the switching circuit 430. A gate of an NMOS transistor N12 is connected to the local I/O line LIO, one end of the NMOS transistor N12 is connected to the line of the ground voltage VSS, and another end of the NMOS transistor N12 is connected to a complementary global I/O line GIOB through the switching circuit 430.

The switching circuit 430 may include NMOS transistors N31 and N32. An NMOS transistor N31 may connects the NMOS transistor N11 of the second sensing circuit 420 to the global I/O line GIO in response to a switching signal PSW, and an NMOS transistor N32 may connect the NMOS transistor N12 of the second sensing circuit 420 to the complementary global I/O line GIOB in response to the switching signal PSW.

Referring to FIG. 5A, at a time point Ta, the LSA 160-1 may perform a sensing operation of amplifying the difference level of a voltage transmitted to the pair of local I/O lines LIO and LIOB. Before the time point Ta, the LSA 160-1 may perform a pre-charge operation of equalizing the pair of local I/O lines LIO and LIOB to the level of the pre-charge voltage VPRE through the equalizing circuit 400. The pre-charge voltage VPRE may be set to have a voltage level corresponding to half the level (less than one half of full-rail) of the first internal power voltage VINTA, for example, the voltage level of VINTA/2. The pair of local I/O lines LIO and LIOB may be configured to be applied to the pair of bit lines BL and BLB during a pre-charge operation of the BLSA 120-1.

The voltage level of the pair of local I/O lines LIO and LIOB is developed by the sensing operation of the LSA 160-1. According to various example embodiments, the voltage level of the local I/O line LIO may start to rise from the level of the pre-charge voltage VPRE toward the level of the second internal power voltage VLSA, and the voltage level of the complementary local I/O line LIOB may fall from the level of the pre-charge voltage VPRE toward the level of ground voltage VSS. Alternatively or additionally according to various example embodiments, the voltage level of the complementary local I/O line LIOB may rise from the level of the pre-charge voltage VPRE toward the level of the second internal power voltage VLSA, and the voltage level of the local I/O line LIO may fall from the level of the pre-charge voltage VPRE toward the level of ground voltage VSS. Therefore, a power rail PR2 (a full rail) of the LSA 160-1 may be set to be from the level of the ground voltage VSS to the level of the second internal power voltage VLSA.

Meanwhile, as shown in FIG. 5B, the BLSA 120-1 pre-charges the pair of bit lines BL and BLB to the level of the pre-charge voltage VPRE during a pre-charge time tPRE, and a charge sharing occurs between charges stored in a cell capacitor of a memory cell 111 connected to the bit line BL and charges stored in the complementary bit line BLB during a charge sharing time tCS. When data '1' is stored in the memory cell 111, the voltage level of the bit line BL will increase by a certain level during the charge sharing operation.

After the charge sharing operation, the BLSA 120-1 may perform a sensing operation based on a voltage difference between the bit line BL and the complementary bit line BLB during a sensing time tSENSE. Accordingly, the bit line BL may rise to the level of the first internal power voltage VINTA, and the complementary bit line BLB may fall to the level of the ground voltage VSS. In some example embodiments, when data '0' is stored in the memory cell 111, the voltage level of the bit line BL will decreases by a certain level during the charge sharing operation, and, during the sensing operation, the bit line BL may fall to the level of the ground voltage VSS, and the complementary bit line BLB may rise to the level of the first internal power voltage VINTA. A power rail PR1 of the BLSA 120-1 may be set to be from the level of the ground voltage VSS to the level of the first internal power voltage VINTA.

In some example embodiments, when data '1' is stored on a true bit line BL, the voltage on the bit line BL will rise and the voltage on the corresponding complementary bit line BLB will fall. In some example embodiments, when data '0' is stored on the true bit line BL, the voltage on the bit line BL will fall and the voltage on the corresponding complementary bit line BLB will rise. In some example embodiments, when data '0' is stored on the complementary bit line BLB, the voltage on the complementary bit line BLB will rise and the voltage on the true bit line BL will fall. In some example embodiments, when data '1' is stored on the complementary bit line BLB, the voltage on the complementary bit line BLB will fall and the voltage on the true bit line BL will rise. Example embodiments are not limited thereto.

As shown in FIG. 5A, the level of the second internal power voltage VLSA of the LSA 160-1 may be set to be higher than the level of the first internal power voltage VINTA of the BLSA 120-1. The reason thereof may be according to the design tendency of lowering the level of the first internal power voltage VINTA of the BLSA 120-1 and increasing the level of the second internal power voltage VLSA of the LSA 160-1 to support the high-speed operation of a DRAM. A voltage difference ΔV between the first internal power voltage VINTA of the BLSA 120-1 and the second internal power voltage VLSA of the LSA 160-1 may have the effect of enhancing a parameter address access time (tAA) of a DRAM. The parameter tAA may be defined as a time for processing a read command when a read command for the same word line WL of the memory cell array 110 is received (e.g., in the case of row-hit). The LSA 160-1 may improve the parameter tAA by increasing the sensing driving capability by increasing the level of the second internal power voltage VLSA.

However, since the level of the first internal power voltage VINTA of the BLSA 120-1 is relatively lower than the level of the second internal power voltage VLSA of the LSA 160-1, as shown in FIG. 4, a leakage current LC may be generated through the column select transistors 141 and 142. The generation of such a leakage current LC may be inevitable, and, as shown in FIG. 5B, the leakage current LC may cause sensing losses 510 and 520 of the BLSA 120-1 and the LSA 160-1. Therefore, high-speed operation of a DRAM may be impossible or challenging. Minimization of or reduction of a leakage current may be beneficial to improve high-speed operation of a DRAM.

Figure 6:
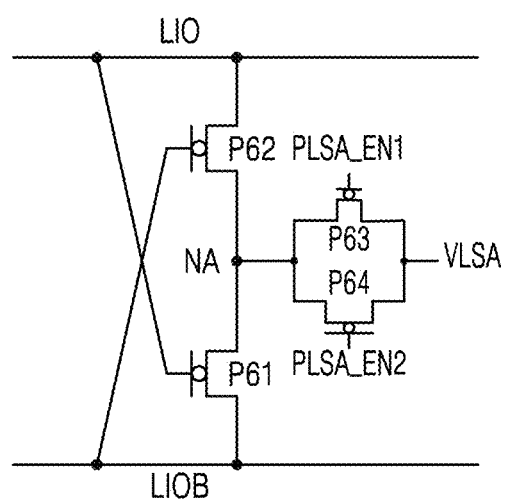
FIG. 6 is a diagram for describing a first sensing circuit of an LSA according to some example embodiments.

FIG. 6 is a diagram for describing a first sensing circuit of an LSA according to some example embodiments. FIG. 6 is a circuit diagram showing the first sensing circuit 410 included in the LSA 160-1 of FIG. 4. In some example embodiments, it will be described that the first sensing circuit 410 amplifies the voltage level of the pair of local I/O lines LIO and LIOB, but example embodiments are not necessarily limited thereto. For example, the first sensing circuit 410 may correspond to a component provided in the LSA 160-1, and it may be described that the LSA 160-1 amplifies the voltage level of the pair of local I/O lines LIO and LIOB. Hereinafter, alphabets attached to reference numerals (e.g., a of 410a, b of 410b, and a of 150a) are used to identify a plurality of circuits having the same function.

Referring to FIG. 6, a first sensing circuit 410a may include PMOS transistors P61, P62, P63, and P64. PMOS transistors P63 and P64 may be connected between a connection node NA between PMOS transistors P61 and P62 and a line of the second internal power voltage VLSA. A size, or either or both of a physical or electrical size, or an electrical width or the driving capabilities of a PMOS transistor P63 may be designed to be relatively smaller than the respective size of a PMOS transistor P64. A first enable signal PLSA_EN1 may be applied to a gate of the PMOS transistor P63, and a second enable signal PLSA_EN2 may be applied to a gate of the PMOS transistor P64. The first enable signal PLSA_EN1 and the second enable signal PLSA_EN2 are provided from a control logic circuit 150a to be described later with reference to FIG. 7, wherein the second enable signal PLSA_EN2 may be enabled a certain period of time after the first enable signal PLSA_EN1 is enabled.

In various example embodiments, a width or a size of the transistor may be a factor in determining a strength, e.g., a driving strength, of the transistor. In some example embodiments, by changing a width or a physical width (or electrical width) of the transistor, a driving strength of the transistor may be changed. In some cases, a larger size transistor or a larger width of a transistor may correspond to a higher driving transistor. In some cases, two transistors may have very similar physical geometric properties, including lengths and/or oxide thicknesses, but may have a different width, and may correspondingly have different driving properties.

An end of a PMOS transistor P61 may be connected to the complementary local I/O line LIOB, another end of the PMOS transistor P61 may be connected to the connection node NA between the PMOS transistors P61 and P62, and a gate of the PMOS transistor P61 may be connected to the local I/O line LIO. An end of a PMOS transistor P62 may be connected to the local I/O line LIO, another end of the PMOS transistor P62 may be connected to the connection node NA between the PMOS transistors P61 and P62, and a gate of the PMOS transistor P62 may be connected to the complementary local I/O line LIOB.

The PMOS transistors P61 and P62 of the first sensing circuit 410a may perform a sensing operation of amplifying the level of a voltage or voltage difference transmitted to the pair of local I/O lines LIO and LIOB. After the first sensing circuit 410a performs a pre-sensing operation by using the second internal power voltage VLSA provided through a PMOS transistor P93, the first sensing circuit 410a may perform a main-sensing operation by using the second internal power voltage VLSA provided through PMOS transistors P93 and P94. During the pre-sensing operation of the first sensing circuit 410a, the sensing driving strength may be weak due to the PMOS transistor P93 having a small size or electrical or physical width. During the main-sensing operation of the first sensing circuit 410a, the sensing driving strength may be stronger than that during the pre-sensing operation due to a PMOS transistor P94 having a large size or electrical or physical width.

Figure 7:
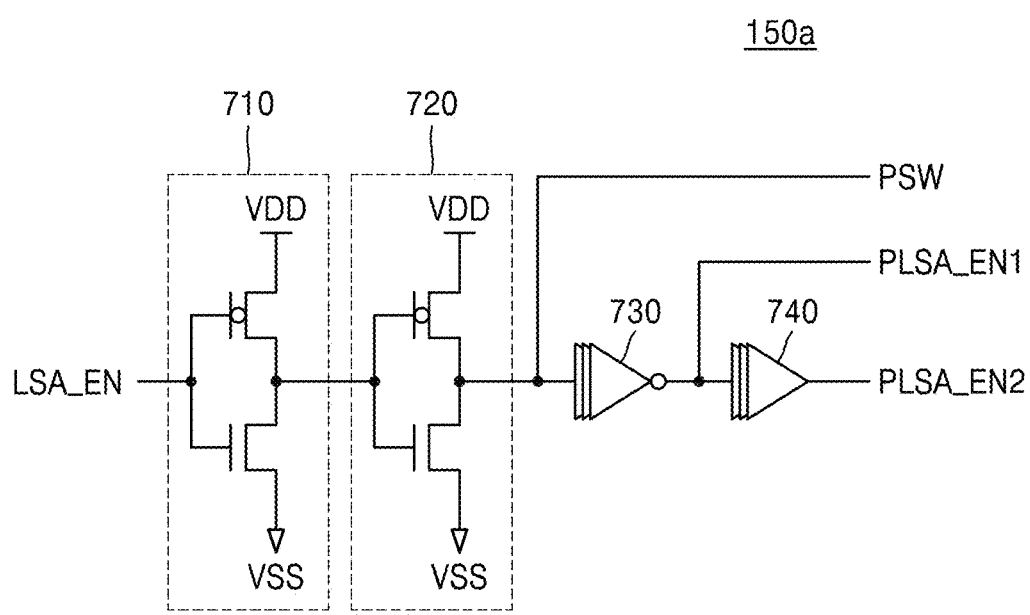
FIGS. 7 and 8 are diagrams for describing a control logic circuit according to some example embodiments.
Figure 8:
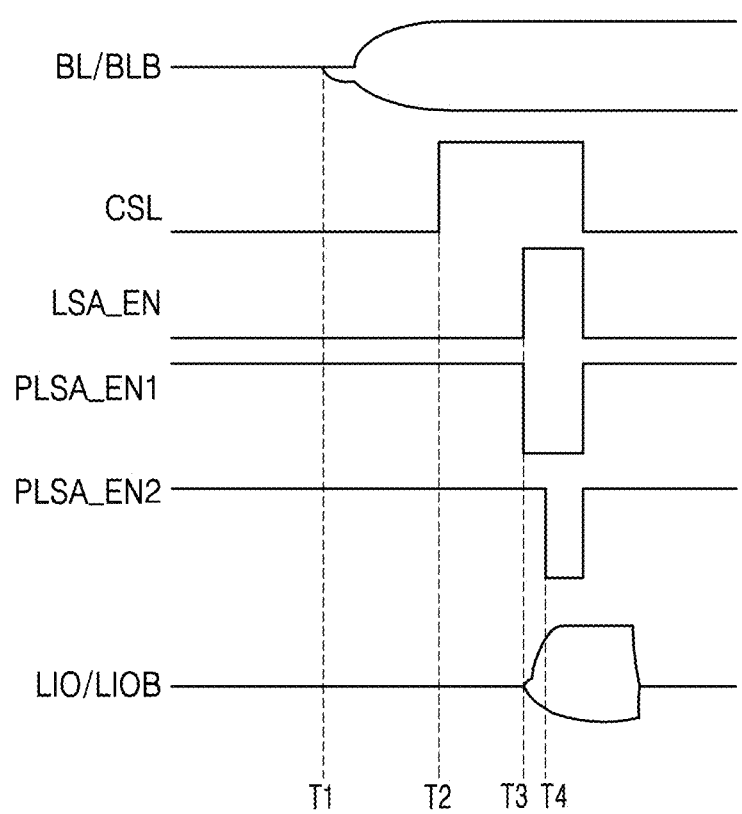

FIGS. 7 and 8 are diagrams for describing a control logic circuit according to some example embodiments. FIG. 7 is a circuit diagram of the control logic circuit 150a generating the first enable signal PLSA_EN1 and the second enable signal PLSA_EN2 provided to the first sensing circuit 410a of FIG. 6, and FIG. 8 is a timing diagram for describing operations of a BLSA 121-1 and the LSA 160-1 of FIG. 4 in association with the first enable signal PLSA_EN1 and the second enable signal PLSA_EN2.

Referring to FIG. 7, the control logic circuit 150a may include a first inverter 710, a second inverter 720, a first delay circuit 730, and a second delay circuit 740. The first delay circuit 730 may refer to a first buffer circuit and the second delay circuit 740 may refer to a second buffer circuit. The control logic circuit 150a may generate an LSA enable signal LSA_EN having a logic high level based on a read command received from a memory controller. The LSA enable signal LSA_EN having a logic high level may be input to the first inverter 710 and the second inverter 720 connected in series, and the second inverter 720 may output the switching signal PSW having a logic high level. The switching signal PSW may be provided to the switching circuit 430 of the LSA 160-1 described in FIG. 4. The NMOS transistors N31 and N32 of the switching circuit 430 may transmit the voltage level of the pair of local I/O lines LIO and LIOB amplified by the LSA 160-1 to the pair of global I/O lines GIO and GIOB in response to the switching signal PSW having a logic high level.

The first delay circuit 730 may be implemented by an odd number of inverters that are connected in series. The first delay circuit 730 may receive and invert the switching signal PSW output from the second inverter 720 and may output the first enable signal PLSA_EN1. The first delay circuit 730 may for example, receive the switching signal PSW having a logic high level and output the first enable signal PLSA_EN1 having a logic low level. The second delay circuit 740 may be implemented by buffers connected in series. The second delay circuit 740 may receive the first enable signal PLSA_EN1 output from the first delay circuit 730, delay the first enable signal PLSA_EN1 by a certain time, and output the second enable signal PLSA_EN2. The second delay circuit 740 may output, for example, the second enable signal PLSA_EN2 having a logic low level that is delayed by a certain time with respect to the first enable signal PLSA_EN1 having a logic low level.

Referring to FIGS. 1, 4, 6, 7, and 8, after the pair of bit lines BL and BLB are pre-charged to the level of the pre-charge voltage VPRE, at a time point T1, a charge sharing occurs between charges stored in a cell capacitor of the memory cell 111 connected to the bit line BL and charges stored in the complementary bit line BLB, and the BLSA 120-1 may perform a sensing operation based on a voltage difference between the bit line BL and the complementary bit line BLB that are charge-shared.

At a time point T2, the column decoder 130 may decode the column address YADD and provide the column select signal CSL having a logic high level. The column address YADD may be provided from a memory controller together with a read command. The column select transistors 141 and 142 may be turned on in response to the column select signal CSL having a logic high level, and thus the pair of bit lines BL and BLB and the pair of local I/O lines LIO and LIOB may be connected to each other.

At a time point T3, the control logic circuit 150a may generate the LSA enable signal LSA_EN having a logic high level based on the read command and generate the first enable signal PLSA_EN1 having a logic low level based on the LSA enable signal LSA_EN having the logic high level. In response to the first enable signal PLSA_EN1 having a logic low level, the PMOS transistor P63 of the first sensing circuit 410 is turned on, and the LSA 160-1 may start a pre-sensing operation of sensing the voltage level of the pair of local I/O lines LIO and LIOB. Here, since the PMOS transistor P63 is implemented by a transistor having a relatively small size and/or electrical and/or physical width, the pre-sensing driving capacity of the LSA 160-1 will be relatively small.

At a time point T4, the control logic circuit 150a may generate the second enable signal PLSA_EN2 having a logic low level. In response to the second enable signal PLSA_EN2 having a logic low level, the PMOS transistor P64 of the first sensing circuit 410 is turned on, and the LSA 160-1 may start a main-sensing operation of sensing a pre-sensed voltage level of the pair of local I/O lines LIO and LIOB. Here, since the PMOS transistor P64 is implemented by a transistor having a relatively large size and/or electrical and/or physical width and/or driving capabilities, the main-sensing driving capacity of the LSA 160-1 will be relatively large. The LSA 160-1 may perform a main-sensing operation by using the second internal power voltage VLSA provided through the PMOS transistors P63 and P64 turned on from the time point T3. Accordingly, the main-sensing operation of the LSA 160-1 may exhibit stronger sensing driving strength than the pre-sensing operation.

Since the sensing driving strength of the LSA 160-1 is set to be relatively weak in the pre-sensing operation from the time point T3 to the time point T4, the leakage current LC flowing through the column select transistors 141 and 142 shown in FIG. 4 may also be relatively small. Therefore, since the sensing losses 510 and 520 of the BLSA 120-1 and LSA 160-1 shown in FIG. 5B may also be reduced, the high-speed operation of a DRAM may be improved.

Figure 9:
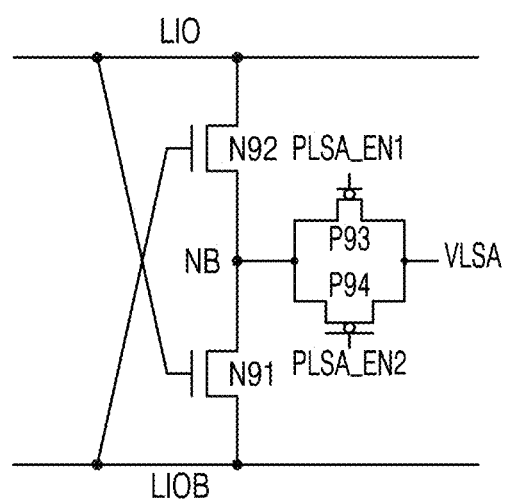
FIG. 9 is a diagram for describing a first sensing circuit of an LSA according to some example embodiments.

FIG. 9 is a diagram for describing a first sensing circuit of an LSA according to some example embodiments. FIG. 9 is a circuit diagram showing the first sensing circuit 410 included in the LSA 160-1 of FIG. 4.

Referring to FIG. 9, a first sensing circuit 410b may include the PMOS transistors P93 and P94 and NMOS transistors N91 and N92. The PMOS transistors P93 and P94 may be connected between a connection node NB between an NMOS transistor N91 and an NMOS transistor N92 and a line of the second internal power voltage VLSA. The size and/or electrical and/or physical width and/or driving capabilities of a PMOS transistor P93 may be designed to be relatively smaller than the size and/or electrical and/or physical width and/or driving capabilities of a PMOS transistor P94. A first enable signal PLSA_EN1 may be applied to a gate of the PMOS transistor P93, and a second enable signal PLSA_EN2 may be applied to a gate of the PMOS transistor P94. The first enable signal PLSA_EN1 and the second enable signal PLSA_EN2 are provided from a control logic circuit 150a to be described later with reference to FIG. 7, wherein the second enable signal PLSA_EN2 may be enabled a certain period of time after the first enable signal PLSA_EN1 is enabled.

An end of the NMOS transistor N91 may be connected to the complementary local I/O line LIOB, another end of the NMOS transistor N91 may be connected to the connection node NB between the NMOS transistors N91 and N92, and a gate of the NMOS transistor N91 may be connected to the local I/O line LIO. An end of the NMOS transistor N92 may be connected to the local I/O line LIO, another end of the NMOS transistor N92 may be connected to the connection node NB between the NMOS transistors N91 and N92, and a gate of the NMOS transistor N92 may be connected to the complementary local I/O line LIOB.

The NMOS transistors N91 and N92 of the first sensing circuit 410b may perform a sensing operation of amplifying the level of a voltage transmitted to the pair of local I/O lines LIO and LIOB. After the first sensing circuit 410b performs a pre-sensing operation by using the second internal power voltage VLSA provided through a PMOS transistor P93, the first sensing circuit 410a may perform a main-sensing operation by using the second internal power voltage VLSA provided through PMOS transistors P93 and P94. During the pre-sensing operation of the first sensing circuit 410b, the sensing driving strength may be weak due to the PMOS transistor P93 having a small size. During the main-sensing operation of the first sensing circuit 410b, the sensing driving strength may be stronger than that during the pre-sensing operation due to a PMOS transistor P94 having a large size.

Since the sensing driving strength is set to be relatively weak in the pre-sensing operation of the first sensing circuit 410b, the leakage current LC flowing through the column select transistors 141 and 142 shown in FIG. 4 may also be relatively small. Therefore, since the sensing losses 510 and 520 of the BLSA 120-1 and LSA 160-1 shown in FIG. 5B may also be reduced, the high-speed operation of a DRAM may be improved.

Figure 10:
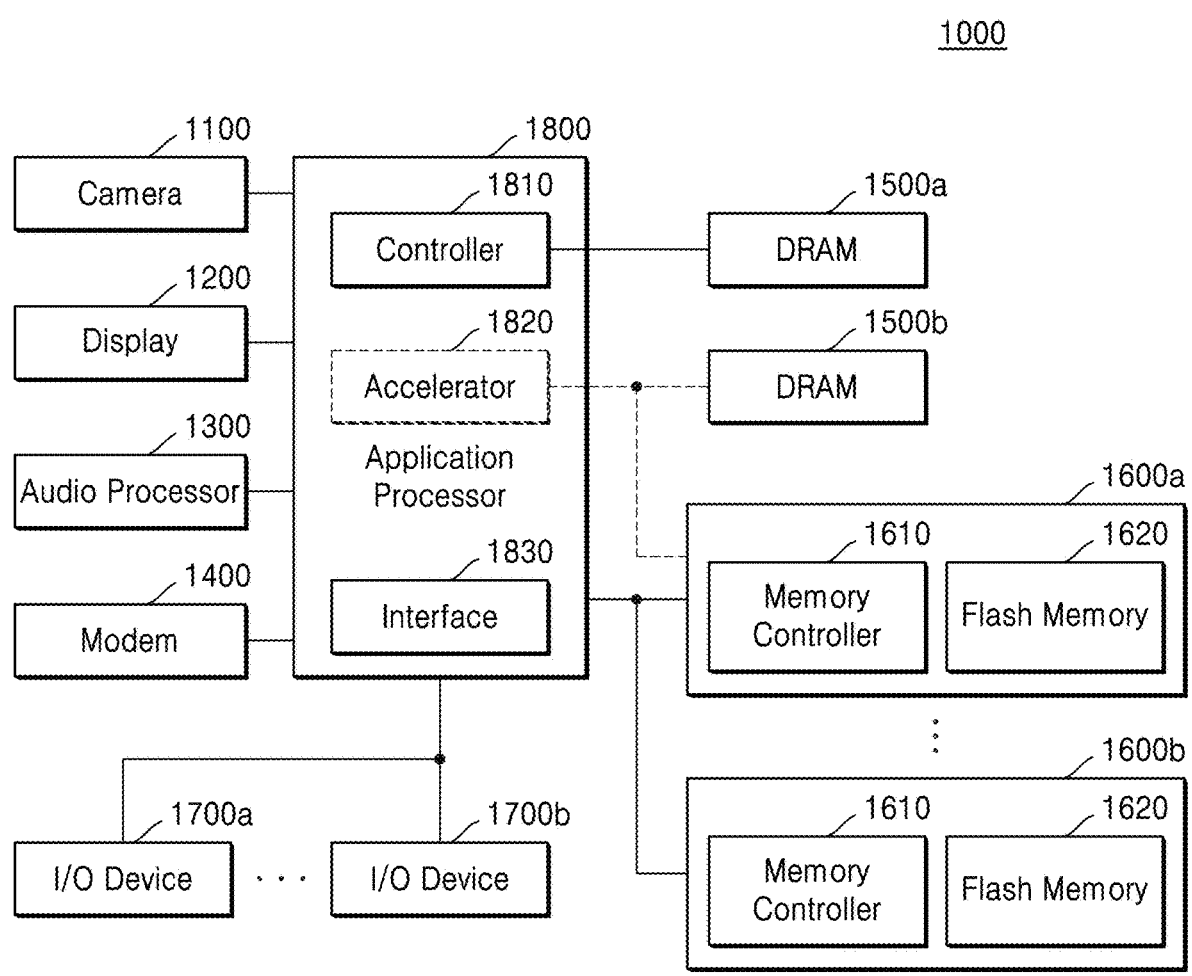
FIG. 10 is a block diagram of a system for describing an electronic device including a memory device according to some example embodiments.

FIG. 10 is a block diagram of a system 1000 for describing an electronic device including a memory device according to some example embodiments.

Referring to FIG. 10, the system 1000 may include a camera 1100, a display 1200, an audio processor 1300, a modem (1400), DRAMs 1500a and 1500b, flash memories 1600a and 1600b, I/O devices 1700a and 1700b, and an application processor (AP) 1800. The system 1000 is implemented as or includes or is included in one or more of a laptop computer, a mobile phone, a smartphone, a tablet personal computer (PC), a wearable device, a healthcare device, or an Internet Of Things (IOT) device. Also, the system 1000 may be implemented as a server and/or a PC.

The camera 1100 may capture a still image or a video according to a user's control and may store captured image/video data or transmit the captured image/video data to the display 1200. The audio processor 1300 may process audio data included in the flash memories 1600a and 1600b or network content. The modem 1400 may transmit a modulated signal for wired/wireless data transmission/reception to a receiver and the modulated signal may be demodulated by the receiver to restore an original signal. The I/O devices 1700a and 1700b may include devices providing a digital input function and/or digital output function, e.g., one or more of a Universal Serial Bus (USB), a storage, a digital camera, a Secure Digital (SD) card, a Digital Versatile Disc (DVD), a network adapter, a touch screen, etc.

The AP 1800 may control the overall operation of the system 1000. The AP 1800 may include a control block 1810, an accelerator block or accelerator chip 1820, and an interface block 1830. The AP 1800 may control the display 1200, such that a part of content stored in the flash memories 1600a and 1600b is displayed on the display 1200. When a user input is received through the I/O devices 1700a and 1700b, the AP 1800 may perform a control operation corresponding to the user input. The AP 1800 may include an accelerator block, which is a circuit dedicated for calculation of Artificial Intelligence(AI) data, or may include an accelerator chip 1820 separately from the AP 1800. The DRAM 1500b may be additionally provided in the accelerator block or the accelerator chip 1820. The accelerator block is a functional block that specializes in performing a particular function of the AP 1800 and may include a GPU, which is a functional block that specializes in processing graphic data, a neural processing unit (NPU), which is a block that specializes in AI calculation and inference, and a data processing unit (DPU), which is a block that specializes in data transmission.

The system 1000 may include a plurality of DRAMs 1500a and 1500b. The AP 1800 may set up a DRAM interface protocol and communicate with the DRAMs 1500a and 1500b to control the DRAMs 1500a and 1500b through commands complying with the Joint Electron Device Engineering Council (JEDEC) standard and mode register (MRS) setting or to use company-specific functions like low voltage/high-speed/reliability and a cyclic redundancy check (CRC)/error correction code (ECC) function. For example, the AP 1800 may communicate with the DRAM 1500a through an interface complying with the JEDEC standards like LPDDR4 and/or LPDDR5, and the accelerator block or the accelerator chip 1820 may set and use a new DRAM interface protocol to control the DRAM 1500*b* for an accelerator, which has a greater bandwidth than the DRAM 1500*a*.

Although FIG. 10 shows only the DRAMs 1500*a* and 1500*b*, the inventive concept is not limited thereto. As long as a bandwidth, a response speed, and voltage conditions of the AP 1800 or the accelerator chip 1820 are satisfied, any memory like a PRAM, an SRAM, an MRAM, an RRAM, an FRAM, or a Hybrid RAM may be used. The DRAMs 1500*a* and 1500*b* have relatively smaller latency and bandwidth than the I/O devices 1700*a* and 1700*b* or the flash memories 1600*a* and 1600*b*. The DRAMs 1500*a* and 1500*b* are initialized when the system 1000 is powered on and the OS and application data are loaded thereto, and thus the DRAMs 1500*a* and 1500*b* may be used as temporary storages for the OS and the application data or may be used as execution spaces for various software code.

In the DRAMs 1500*a* and 1500*b*, a number such as four or more arithmetic operations (e.g., addition, subtraction, multiplication, and division), vector calculations, address calculations, or Fast Fourier Transform (FFT) calculations may be performed. Alternatively or additionally, in the DRAMs 1500*a* and 1500*b*, a function for an operation used for an inference may be performed. Here, the inference may be performed in a deep learning algorithm using an artificial neural network. The deep learning algorithm may include a training operation for learning a model through various data and an inference operation for recognizing data with the trained model. According to various example embodiments, an image captured by a user through the camera 1100 is signal-processed and stored in the DRAM 1500*b*, and the accelerator block or accelerator chip 1820 may perform AI data calculation for recognizing data using data stored in the DRAM 1500*b* and a function used for inference.

The system 1000 may include a plurality of storages or flash memories 1600*a* and 1600*b* having a larger capacity than the DRAMs 1500*a* and 1500*b*. The accelerator block or the accelerator chip 1820 may perform a training operation and an AI data calculation using the flash memories 1600*a* and 1600*b*. According to an embodiment, the flash memories 1600*a* and 1600*b* may include a memory controller 1610 and a flash memory device 1620, and a training operation and an inference AI data calculation performed by the AP 1800 and/or the accelerator chip 1820 may be performed more efficiently by using an arithmetic unit included in the memory controller 1610. The flash memories 1600*a* and 1600*b* may store images captured through the camera 1100 or data transmitted through a data network. For example, the flash memories 2600*a* and 2600*b* may store one or more of Augmented Reality/Virtual Reality content, High Definition (HD) content, or Ultra High Definition (UHD) content.

In the system 1000, the DRAMs 1500*a* and 1500*b* may include a LSA circuit that performs a 2-step sensing operation to reduce a leakage current due to a driving voltage difference from a BLSA circuit described with reference to FIGS. 1 to 9. The LSA circuit may include first and second sensing transistors, a pre-sensing driver, and a main-sensing driver. The first and second sensing transistors may be connected in series between a local I/O line and a complementary local I/O line, a gate of a first sensing transistor may be connected to the local I/O line, and a gate of a second sensing transistor may be connected to the complementary local I/O line. The pre-sensing driver may drive an LSA sensing voltage to a connection node between the first and second sensing transistors during a pre-sensing operation of the LSA circuit. The main-sensing driver may drive an LSA sensing voltage to a connection node between the first and second sensing transistors during a main-sensing operation of the LSA circuit. The driving strength of the pre-sensing driver is set to be weaker than the driving strength of the main-sensing driver, and the pre-sensing driver may be driven before the main-sensing driver. The LSA circuit may reduce a leakage current flowing through a column select transistor by setting the sensing driving strength of the pre-sensing operation to be relatively weak. Also, as the sensing loss of the BLSA circuit and the LSA circuit decreases, high-speed operation of a DRAM may be improved.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While inventive concepts have been particularly shown and described with reference to some example embodiments thereof, it will be understood that various changes in form and details may be made therein without departing from the spirit and scope of the following claims. Furthermore, example embodiments are not necessarily mutually exclusive with one another. For example, some example embodiments may include one or more features described with reference to one or more figures, and may also include one or more other features described with reference to one or more other figures.

What is claimed is:

1. A local input/output (I/O) line sense amplifier (LSA) circuit configured to amplify a level of a voltage difference of a pair of local I/O lines electrically connected to a pair of bit lines connected to a bit line sense amplifier (BLSA) circuit, the LSA circuit comprising:
   a first sensing transistor and a second sensing transistor that are connected in series between a local I/O line and a complementary local I/O line, wherein a gate of the first sensing transistor is connected to the local I/O line, and a gate of the second sensing transistor is connected to the complementary local I/O line;
   a pre-sensing driver configured to drive an LSA sensing voltage to a connection node between the first sensing transistor and the second sensing transistor during a pre-sensing operation of the LSA circuit; and
   a main-sensing driver configured to drive the LSA sensing voltage to the connection node during a main-sensing operation of the LSA circuit,
   wherein a driving strength of the pre-sensing driver is set to be weaker than a driving strength of the main-sensing driver,
   the LSA circuit is configured to operate such that the pre-sensing driver is driven before the main-sensing driver,
   wherein
   the pre-sensing driver comprises a first PMOS transistor connected between the connection node and an LSA sensing voltage line, and a gate of the first PMOS transistor is connected to a first LSA enable signal, the main-sensing driver comprises a second PMOS transistor connected between the connection node and the LSA sensing voltage line, and a gate of the second PMOS transistor is connected to a second LSA enable signal, and the LSA circuit is configured to operate such that the first LSA enable signal is activated after a first delay in response to a switching signal being activated, and the second LSA enable signal is activated after a second delay in response to the first LSA enable signal being activated.

2. The LSA circuit of claim 1, wherein at least one of an electrical size or a physical size of the first PMOS transistor is smaller than a respective one of the electrical size or the physical size of the second PMOS transistor.

3. The LSA circuit of claim 1, wherein the first sensing transistor and the second sensing transistor comprise PMOS transistors.

4. The LSA circuit of claim 1, wherein the first sensing transistor and the second sensing transistor comprise NMOS transistors.

5. The LSA circuit of claim 1, wherein the LSA circuit further comprises:
a third sensing transistor and a fourth sensing transistor that are configured to transmit an amplified voltage level of the local I/O line and the complementary local I/O line to a global I/O line and a complementary global I/O line, the third sensing transistor is connected between a ground voltage line and the global I/O line and has a gate connected to the complementary local I/O line, the fourth sensing transistor is connected between the ground voltage line and the complementary global I/O line and has a gate connected to the local I/O line, and the third sensing transistor and the fourth sensing transistor comprise NMOS transistors.

6. The LSA circuit of claim 1, wherein the BLSA circuit is configured to sense and amplify a voltage difference of the pair of bit lines according to a BLSA sensing voltage level, and
an LSA sensing voltage level is set to be higher than the BLSA sensing voltage level.

7. The LSA circuit of claim 6, further comprising:
an equalizing circuit configured to equalize the local I/O line and the complementary local I/O line to a pre-charge voltage in response to an equalizing signal,
wherein the pre-charge voltage has a voltage level corresponding to half of the BLSA sensing voltage level.

8. The LSA circuit of claim 7, wherein the equalizing circuit includes
a first equalizing NMOS transistor connected to the local I/O line,
a second equalizing NMOS transistor connected to the complementary local I/O line and to the first equalizing NMOS transistor at a first equalizing node.

9. The LSA circuit of claim 8, wherein the equalizing circuit further includes
a third equalizing NMOS transistor connected between the local I/O line and to the complementary local I/O line, and the gate of the third equalizing NMOS transistor connected to a gate of the first equalizing NMOS transistor and a gate of the second equalizing NMOS transistor at a second equalizing node.

10. The LSA circuit of claim 9, wherein the pre-charge voltage is configured to be transmitted to the first equalizing node and the equalizing signal is configured to be transmitted to the second equalizing node.

* * * * *